(12) United States Patent
Renilson et al.

(10) Patent No.: US 10,944,182 B2
(45) Date of Patent: Mar. 9, 2021

(54) 3-D PRINTING PROCESS FOR FORMING FLAT PANEL ARRAY ANTENNA

(71) Applicant: CommScope Technologies LLC, Hickory, NC (US)

(72) Inventors: Ian Thomas Renilson, Fife (GB); Claudio Biancotto, Edinburgh (GB); David J. Walker, Glasgow (GB)

(73) Assignee: CommScope Technologies LLC, Hickory, NC (US)

( * ) Notice: Subject to any disclaimer, the term of this patent is extended or adjusted under 35 U.S.C. 154(b) by 320 days.

(21) Appl. No.: 16/067,926

(22) PCT Filed: Feb. 21, 2017

(86) PCT No.: PCT/US2017/018644
§ 371 (c)(1),
(2) Date: Jul. 3, 2018

(87) PCT Pub. No.: WO2017/155683
PCT Pub. Date: Sep. 14, 2017

(65) Prior Publication Data
US 2020/0274252 A1    Aug. 27, 2020

Related U.S. Application Data

(60) Provisional application No. 62/305,881, filed on Mar. 9, 2016.

(51) Int. Cl.
*H01Q 21/00* (2006.01)
*B33Y 80/00* (2015.01)
*H01Q 21/06* (2006.01)

(52) U.S. Cl.
CPC .......... *H01Q 21/0087* (2013.01); *B33Y 80/00* (2014.12); *H01Q 21/064* (2013.01)

(58) Field of Classification Search
CPC .................................................. H01Q 21/0087
See application file for complete search history.

(56) References Cited

U.S. PATENT DOCUMENTS

| | | | |
|---|---|---|---|
| 8,558,746 B2 | 10/2013 | Thomson et al. | |
| 2009/0153426 A1* | 6/2009 | Worl | H01Q 21/064 343/776 |
| 2012/0084968 A1 | 4/2012 | Nath et al. | |
| 2012/0303347 A1 | 11/2012 | Difoggio | |
| 2013/0170171 A1 | 7/2013 | Wicker et al. | |

(Continued)

OTHER PUBLICATIONS

Office Action corresponding to Chinese Application No. 201780004287.7 dated Jan. 2, 2020.

(Continued)

*Primary Examiner* — Ricardo I Magallanes
(74) *Attorney, Agent, or Firm* — Myers Bigel, P.A.

(57) ABSTRACT

A method of forming a flat panel array antenna includes the steps of: (a) providing a digitized design for a flat panel array, the flat panel array comprising a plurality of geometric features that vary in area along a thickness dimension of the flat panel array; (b) subdividing the digitized design into a plurality of thin strata stacked in the thickness dimension; (c) forming a thin layer of material corresponding to one of the thin strata; (d) fixing the thin layer of material; and (e) repeating steps (c) and (d) to form a flat panel array.

13 Claims, 4 Drawing Sheets

(56) References Cited

U.S. PATENT DOCUMENTS

2014/0268604 A1* 9/2014 Wicker .................. B33Y 30/00
361/760
2015/0295651 A1 10/2015 Herbsommer et al.
2016/0346997 A1* 12/2016 Lewis .................... B33Y 80/00

OTHER PUBLICATIONS

International Search Report corresponding to International Application No. PCT/US2017/018544 dated May 31, 2017.
Written Opinion of the International Searching Authority corresponding to International Application No. PCT/US2017/018644 dated May 31, 2017.
Supplementary European Search Report corresponding to European Appiication No. 17763728.7 dated Sep. 9, 2019.
Guan-Long et al. "3-D Metal-Direct-Printed Wideband and High-Efficiency Waveguide-Fed Antenna Array", The Institute of Electrical and Electronics Engineers, Inc. (IEEE) Conference Proceedings (2015).
Shellabear et al. "DMLS—Development History and State of the Art", Laser Assisted Netshape Engineering (Lane) Conference (2004).
International Preliminary Report on Patentability corresponding to International Application No. PCT/US2017/018644 dated Sep. 20, 2018.

\* cited by examiner

3-D PRINTING PROCESS FOR FORMING FLAT PANEL ARRAY ANTENNA

RELATED APPLICATIONS

The present application is a 35 U.S.C. § 371 national phase application of and claims priority to PCT Application PCT/US2017/018644 filed Feb. 21, 2017, which claims priority from and the benefit of U.S. Provisional Application No. 62/305,881, filed Mar. 9, 2016, the disclosure of each of which is incorporated herein by reference in its entirety.

FIELD OF THE INVENTION

The present application is directed generally to antennas, and more particularly to flat panel antennas.

BACKGROUND

Flat panel array antenna technology has not been extensively applied within the licensed commercial microwave point-to-point or point-to-multipoint market, where stringent electromagnetic radiation envelope characteristics consistent with efficient spectrum management are common. Antenna solutions derived from traditional reflector antenna configurations such as prime focus-fed axisymmetric geometries provide high levels of antenna directivity and gain at relatively low cost. However, the extensive structure of a reflector dish and associated feed may require significantly enhanced support structure to withstand wind loads, which may increase overall costs. Further, the increased size of reflector antenna assemblies and the support structure required may be viewed as a visual blight.

Array antennas typically utilize either printed circuit technology or waveguide technology. The components of the array which interface with free space, known as the elements, typically utilize microstrip geometries, such as patches, dipoles or slots, or waveguide components such as horns or slots. The various elements are interconnected by a feed network, so that the resulting electromagnetic radiation characteristics of the antenna conform to desired characteristics, such as the antenna beam pointing direction, directivity, and sidelobe distribution.

Flat panel arrays may be formed, for example, using waveguide or printed slot arrays in either resonant or travelling wave configurations. Resonant configurations typically cannot achieve the requisite electromagnetic characteristics over the bandwidths utilized in the terrestrial point-to-point market sector, while travelling wave arrays typically provide a mainbeam radiation pattern which moves in angular position with frequency. Because terrestrial point to point communications generally operate with Go/Return channels spaced over different parts of the frequency band being utilized, movement of the mainbeam with respect to frequency may prevent simultaneous efficient alignment of the link for both channels.

U.S. Pat. No. 8,558,746 to Thompson et al. discusses a flat panel array antenna constructed as a series of different layers. Shown therein are flat panel arrays that include input, intermediate and output layers, with some embodiments including one or more slot layers and one or more additional intermediate layers. The layers are manufactured separately (typically via machining or casting) and stacked to form an overall feed network. The disclosure of this patent is hereby incorporated herein by reference in its entirety.

SUMMARY

As a first aspect, embodiments of the invention are directed to a method of forming a flat panel array antenna, comprising the steps of: (a) providing a digitized design for a flat panel array, the flat panel array comprising a plurality of geometric features that vary in area along a thickness dimension of the flat panel array; (b) subdividing the digitized design into a plurality of thin strata stacked in the thickness dimension; (c) forming a thin layer of material corresponding to one of the thin strata; (d) fixing the thin layer of material; and (e) repeating steps (c) and (d) to form a flat panel array.

As a second aspect, embodiments of the invention are directed to a flat panel array antenna formed by the process described above.

DETAILED DESCRIPTION OF EMBODIMENTS OF THE INVENTION

Figure 1A:
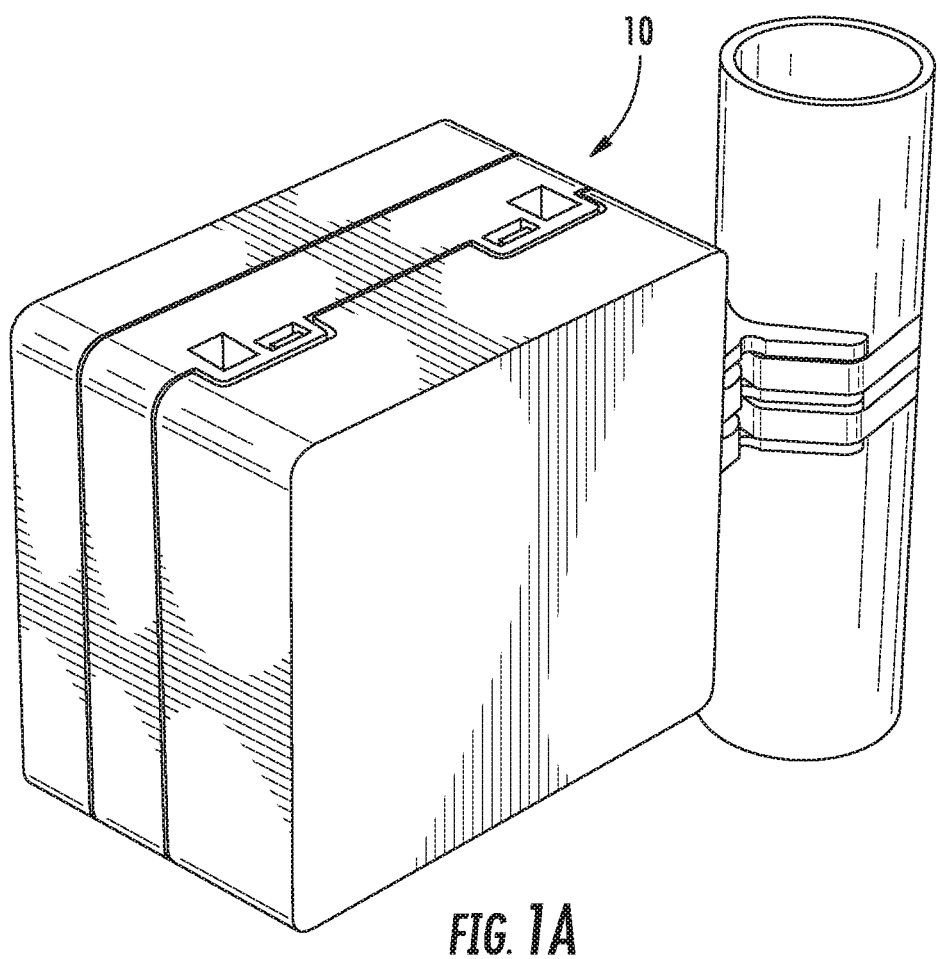
FIG. 1A is a perspective view of a flat panel array antenna.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Figure 1B:
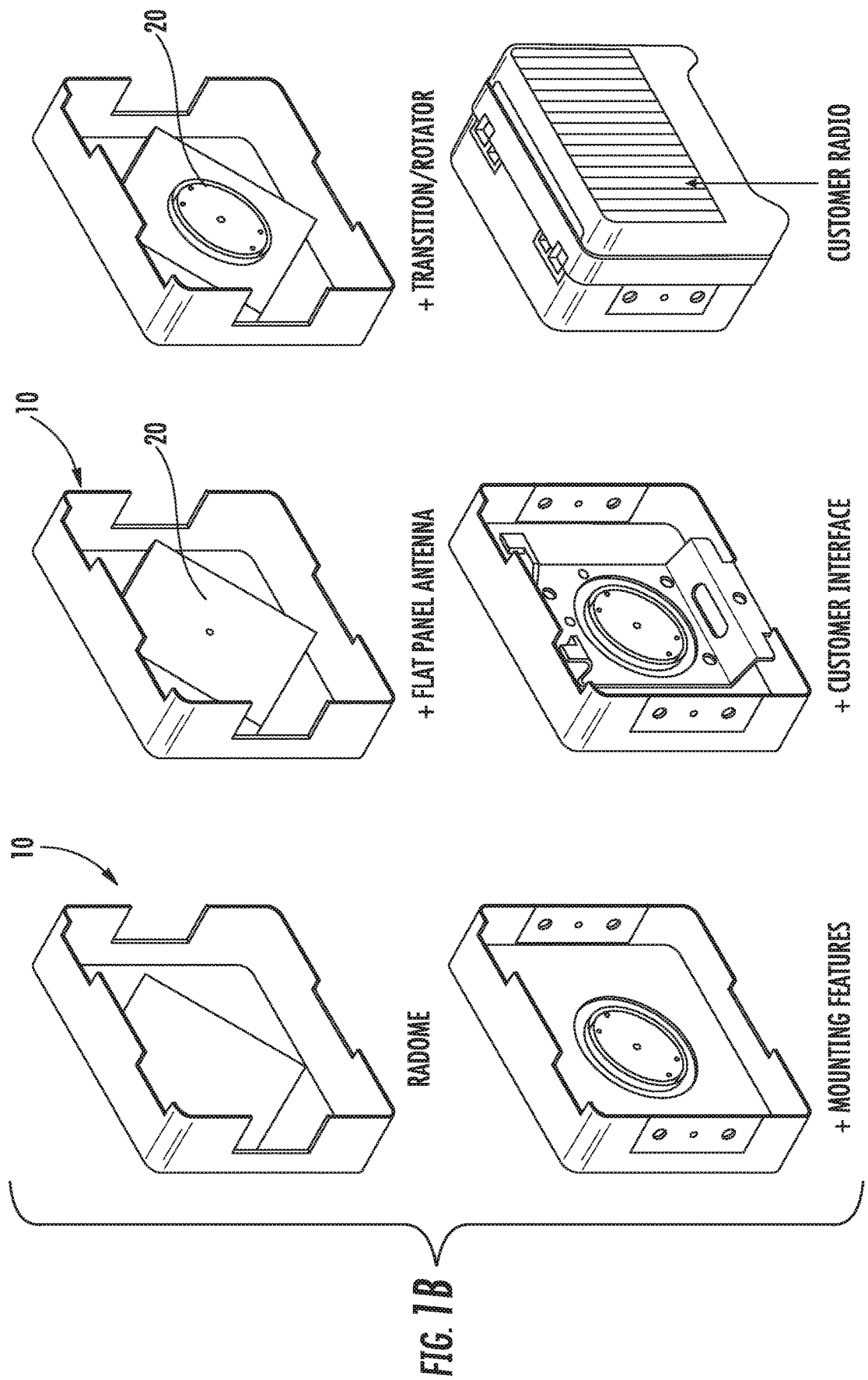
FIG. 1B is a series of perspective views showing the construction of a flat panel array antenna.

Referring now to the figures, an antenna assembly, designated broadly at 10, is shown in FIGS. 1A and 1B. The antenna assembly 10 includes, inter alia, a flat panel array 20 as described above. As noted, typically flat panel array antennas 20 have been formed in multiple layers via machining or casting. However, these techniques can present performance issues as well as high manufacturing and part costs. Machining is typically employed for prototyping and low volume parts. Complex parts are formed by conventional machining techniques, whereas simpler layers may be formed using punched plates. Casting is typically employed for higher volume parts, but requires a considerable investment in tooling.

Other issues may also be presented by machining and casting. For example, machined parts typically have sharp corners and lack "draft" angles for holes, edges and the like. In contrast, cast parts typically have more radiused corners and include some draft angle, both of which can facilitate removal of the part from the casting mold. Because the configurations of the machined and cast parts are slightly different, they can have somewhat different performance characteristics. As a result, when a flat panel array is prototyped with machined parts, it may deliver somewhat different performance than the same flat panel array produced via casting in production volumes.

In addition, cast parts will include split lines or weld lines that are formed when material flows within the mold around a mold feature to form a hole, slot or the like (which are numerous in many flat panel array layers). The presence of split lines can cause loss and energy leakage in the antenna, which can affect radiation patterns and generate interference with nearby devices.

In addition, antennas of a different size and/or frequency may have different flat panel array layers. As such, separate casting tools (which are expensive) may be required for each variety of antenna produced.

Many of these issues may be addressed via manufacturing flat panel arrays through the use of a three-dimensional (3D) printing process. With this technique, the three-dimensional structure of a substrate (in this instance the entire flat panel array, with all of its layers) is digitized via computer-aided solid modeling or the like. The coordinates defining the substrate are then transferred to a device that uses the digitized data to build the substrate. Typically, a processor subdivides the three-dimensional geometry of the substrate into thin "slices" or layers. Based on these subdivisions, a printer or other application device then applies thin layers of material sequentially to build the three-dimensional configuration of the substrate. Some methods melt or soften, then harden, material to produce the layers, while others cure liquid materials using different methods to form, then fix, the layers in place. 3D printing techniques are particularly useful for items that vary in area along the thickness dimension (i.e., the dimension that is normal to the thin "slices").

One such technique involves the use of a selective laser, which can employed in either selective laser sintering (SLS) or selective laser melting (SLM). Like other methods of 3D printing, an object formed with an SLS/SLM machine starts as a computer-aided design (CAD) file. CAD files are converted to a data format (e.g., an .stl format), which can be understood by a 3D printing apparatus. A powder material, such as a metal or polymer, is dispersed in a thin layer on top of the build platform inside an SLS machine. A laser directed by the CAD data pulses down on the platform, tracing a cross-section of the object onto the powder. The laser heats the powder either to just below its boiling point (sintering) or above its melting point (melting), which fuses the particles in the powder together into a solid form. Once the initial layer is formed, the platform of the SLS machine drops—usually by less than 0.1 mm—exposing a new layer of powder for the laser to trace and fuse together. This process continues again and again until the entire object has been formed. When the object is fully formed, it is left to cool in the machine before being removed.

Another 3D printing technique is multi-jet modeling (MJM). With this technique, multiple printer heads apply layers of structural material to form the substrate. Often, layers of a support material are also applied in areas where no material is present to serve as a support structure. The structural material is cured, then the support material is removed. As an example, the structural material may comprise a curable polymeric resin or a fusable metal, and the support material may comprise a paraffin wax that can be easily melted and removed.

Another such technique is fused deposition modeling (FDM). Like MJM, this technique also works on an "additive" principle by laying down material in layers. A plastic filament or metal wire is unwound from a coil and supplies material to an extrusion nozzle which can turn the flow on and off. The nozzle is heated to melt the material and can be moved in both horizontal and vertical directions by a numerically controlled mechanism, directly controlled by a computer-aided manufacturing (CAM) software package. The model or part is produced by extruding small beads of material to form layers; typically, the material hardens immediately after extrusion from the nozzle, such that no support structure is employed.

Still other techniques of additive manufacturing processes include stereolithography (which employs light-curable material and a precise light source), laminated object manufacturing, metal arc welding, wire feed additive manufacturing, binder jetting, electron beam melting, blown powder, metal and binder, welding and other emerging technologies.

Irrespective of which 3D printing technique is employed, there are multiple potential advantages for the production of a flat panel array. First, the internal feeding networks and complex RF output layer profiles (including undercuts) of the flat panel array can be formed in one piece, rather than as separate layers, which reduces time and eliminates the cost of multiple tools. Second, parts produced during the development from initial prototype/low volume production to high volume production should have the same RF profile, rather than the slightly different profile based on the differences between machined parts and cast parts. Consequently, the development may be reduced to merely mechanical issues such as flatness, alignment and clamping, without electrical issues resulting from the differences in machined and cast panels. These mechanical issues are typically the same for each frequency, so the development time, effort and cost to convert a full range of antennas from prototype/low volume production to high volume production may be considerably less.

Figure 2:
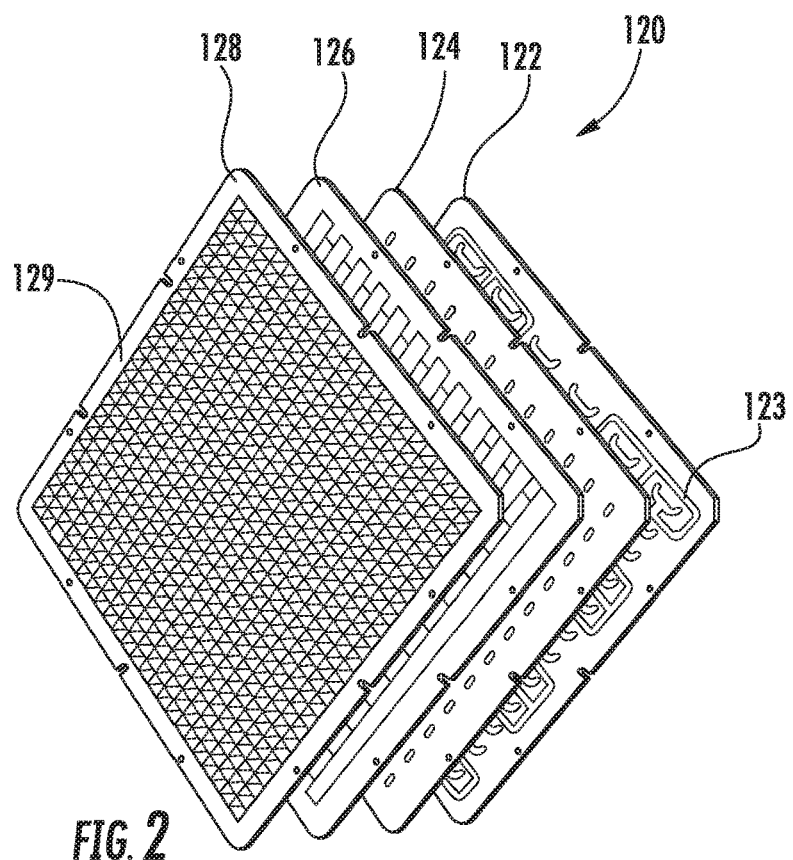
FIG. 2 is an exploded perspective view of the flat panel array antenna of FIG. 1 showing the different layers of the feeding network.
Figure 3:
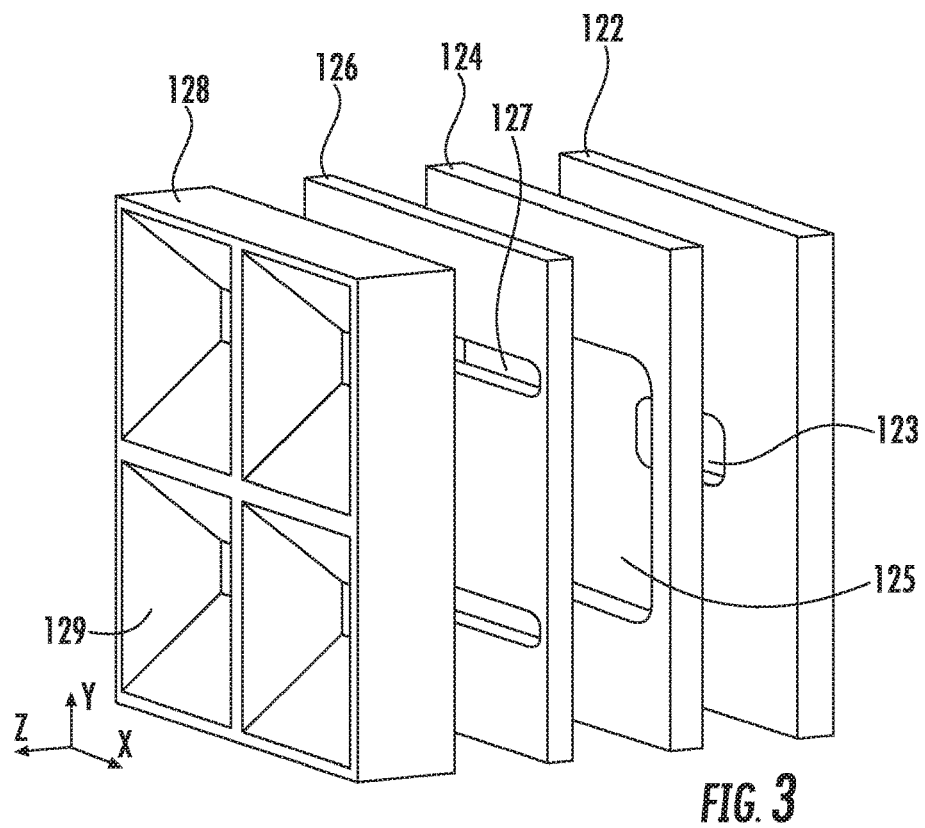
FIG. 3 is an enlarged exploded perspective view of the elements of the layers of the flat panel array antenna of FIG. 2.
Figure 5:
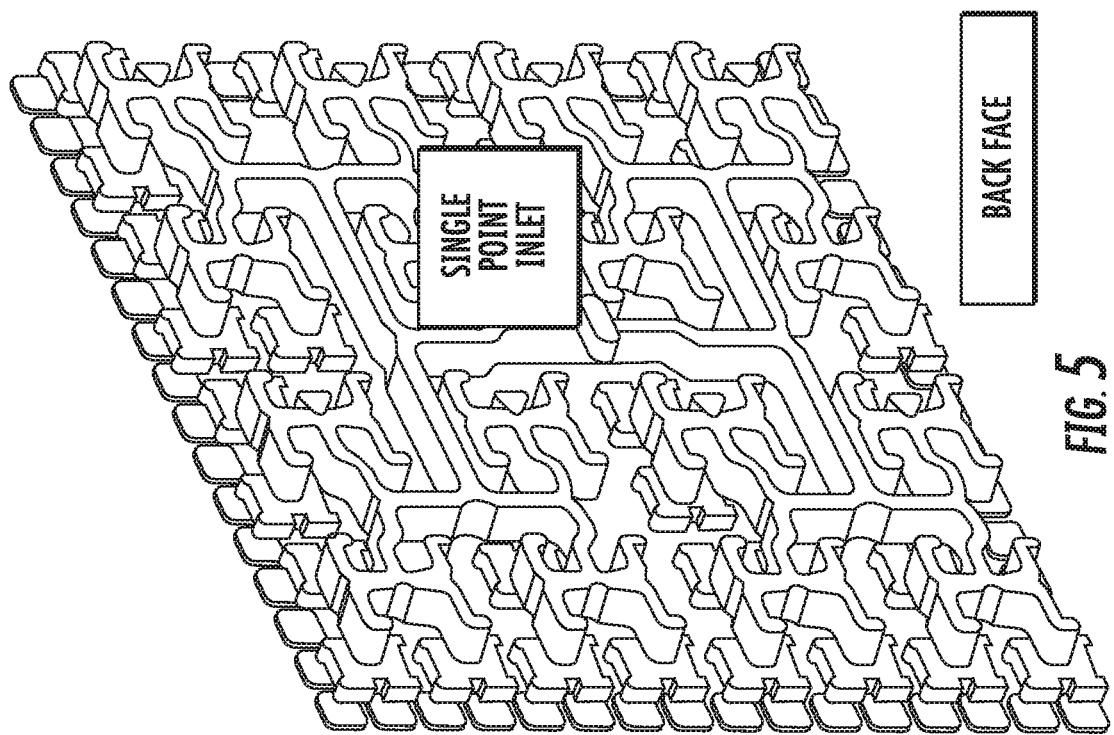
FIGS. 4 and 5 are RF air models associated with the flat panel array antenna of FIGS. 2 and 3.
Figure 4:
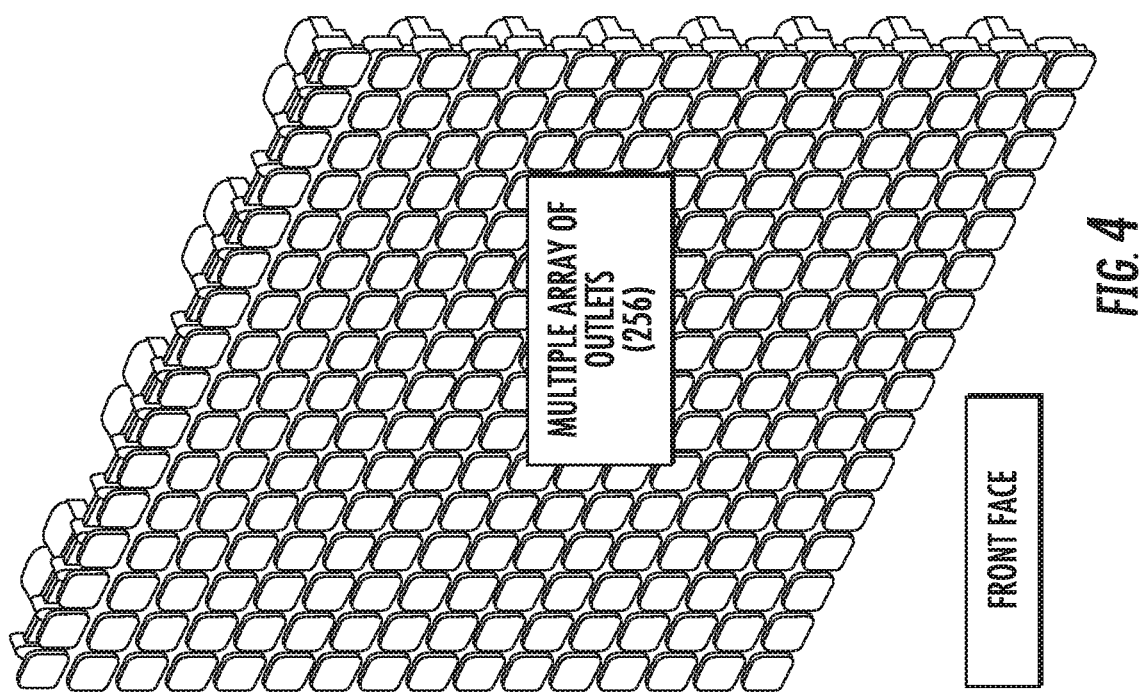

Referring again to the figures, FIGS. 2 and 3 illustrate an exemplary flat panel array 120. The exemplary flat panel array 120 includes four overlying layers 122, 124, 126, 128, each of which has a unique geometry. The layers 122, 124, 126, 128 are designed such that, when combined, they form a feed network for distributing RF signals from a central output; As examples, the layers 122, 124, 126, 128 may include features such as holes, slots, ridges, sloping surfaces, and the like as part of the geometry of the overall flat panel array 120. These features tend to vary along the thickness dimension of the flat panel array 120. For example, the layers may comprise an input layer 122 with power dividers 123, an intermediate layer 124 with coupling cavities 125, a slot layer 126 with slots 127, and an output layer 128 with horn radiators 129 (see FIGS. 2 and 3). The layers are also depicted in the air models associated with the flat panel array 120 illustrated in FIGS. 4 and 5. Those of skill in this art will appreciate that other types of features may be present as desired (some such features are described in U.S. Pat. No. 8,558,746, supra).

As will be understood by those of skill in this art, the flat panel array 120, including the various layers 122, 124, 126, 128, may be formed in a single operation via one or more of the 3D printing techniques discussed above. As noted, 3D printing builds structures by forming thin strata or "slices" of the structure one at a time until the entire structure is completed. In the case of the flat panel array 120, the different layers 122, 124, 126, 128 can be formed in a single continuous operation, which includes the formation of voids, hollows, closed channels, ridges, undercuts, and the like within the overall structure that would not be possible to form with a machining or casting operation.

Those skilled in this art will appreciate that the configuration of the flat panel array 120 is exemplary only. Other configurations are also possible, including flat panel arrays that include more or fewer layers than the four layers 122, 124, 126, 128 shown herein, and/or flat panel arrays that have different contours and features than those shown herein.

In addition, some layers may be formed via other techniques. For example, rather than employing a build platform as described above, the 3D printing may be performed by printing onto a substrate that is geometrically simple that can then form the structural backplate of the antenna. This substrate could be formed from a machined plate (for prototype/low volume production), or a cast plate (for high volume production), with these operations being more cost-effective due to the simplified geometry of the backplate.

As another example, the output layer 128, which includes the horn radiators 129, may be formed via 3D printing, with the remaining layers 122, 124, 126 formed via casting. This configuration takes advantage of the benefits of 3D printing for the output layer 128, but enables casting operations (which can produce a less "lossy" surface) to be employed for the other layers, for which surface finish can be more important.

It is also contemplated that, although 3D printing of metals has been the focus of much of the discussion above, 3D printed plastic parts with subsequently metalized surfaces may also be employed.

Those skilled in this art will further appreciate that 3D printing can also be used to form external shapes that can be used to improve RF performance of the antenna, such as backlobe and sidelobe EM suppression devices (see, e.g., U.S. Patent Publication Nos. 2015/0116184 and 2013/0082896, the disclosures of which are hereby incorporated herein in their entirety). 3D printing may also be employed to form other components used in antennas, such as transitions and polarizers as shown in FIG. 1B, orthomode transducers (OMTs), couplers, diplexers, filters and the like.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of forming a flat panel array antenna through the use of a three-dimensional (3D) printing process, comprising the steps of:
    (a) providing a digitized design for a flat panel array having a plurality of overlying layers, the flat panel array comprising a plurality of geometric features that vary in area along a thickness dimension of the flat panel array;
    (b) subdividing the digitized design into a plurality of thin strata stacked in the thickness dimension, each thin stratum corresponding to a respective overlying layer having a unique geometry from the other overlying layers;
    (c) forming a first thin layer of material on a substrate corresponding to one of the thin strata, wherein the substrate is formed from a machined plate or a cast plate and configured to serve as a backplate for the flat panel array;
    (d) fixing the first thin layer of material;
    (e) forming a subsequent thin layer of material on the first thin layer of material, the subsequent thin layer of material corresponding to one of the thin strata;
    (f) fixing the subsequent thin layer of material; and
    (g) repeating steps (e) and (f) to form a flat panel array in a single operation.

2. The method defined in claim 1, wherein geometric features include at least one of holes, slots, and undercuts.

3. The method defined in claim 1, wherein the thin layer of material comprises a metallic material.

4. The method defined in claim 1, wherein steps (d) and (f) comprise heating the thin layer.

5. The method defined in claim 1, wherein the flat panel array includes a plurality of distinct flat panel array layers.

6. The method defined in claim 5, wherein the flat panel array layers include at least one of an input layer, an intermediate layer, a slot layer, and an output layer.

7. The method defined in claim 5, wherein the flat panel array layers include one or more of slots, coupling cavities, power dividers and radiation horns.

8. A flat panel array formed by the method of claim 1.

9. The flat panel array defined in claim 8, wherein geometric features include at least one of holes, slots, and undercuts.

10. The flat panel array defined in claim 8, wherein the thin layer of material comprises a metallic material.

11. The flat panel array defined in claim 8, wherein the flat panel array includes a plurality of distinct flat panel array layers.

12. The flat panel array defined in claim 11, wherein the flat panel array layers include at least one of an input layer, an intermediate layer, a slot layer, and an output layer.

13. The flat panel array defined in claim 11, wherein the flat panel array layers include one or more of slots, coupling cavities, power dividers and radiation horns.

* * * * *